Dec. 18, 1923.
R. F. ENSIGN
FUEL CLEANER
Filed April 15, 1919
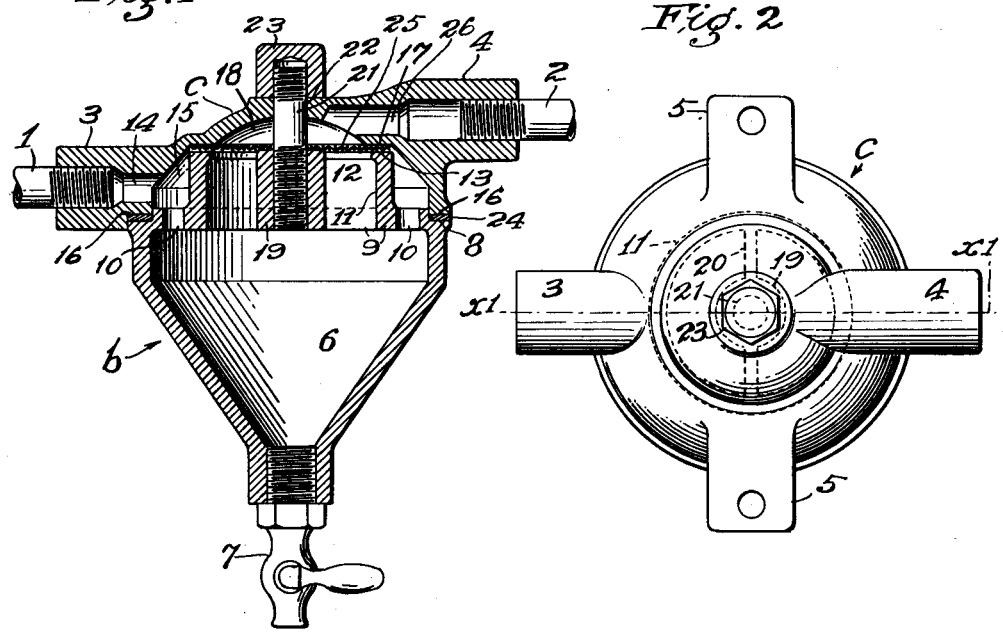
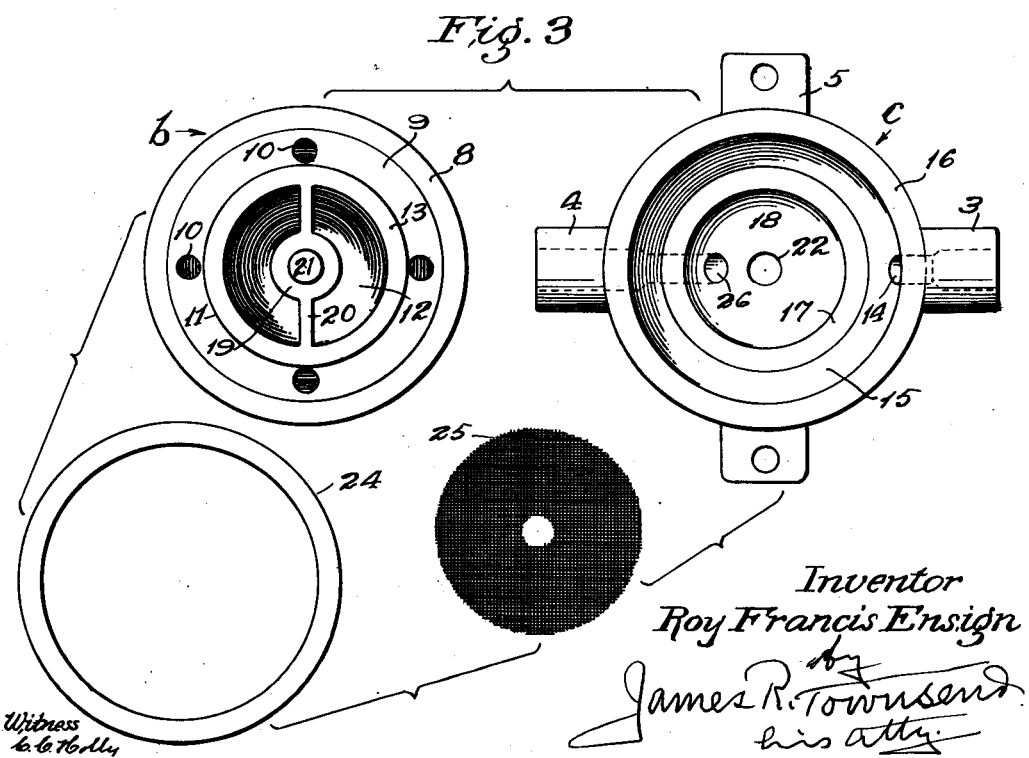
Inventor
Roy Francis Ensign
James R. Townsend
his atty Patented Dec. 18, 1923.

1,477,947

UNITED STATES PATENT OFFICE.

ROY FRANCIS ENSIGN, OF PASADENA, CALIFORNIA.

FUEL CLEANER.

Application filed April 15, 1919. Serial No. 290,315.

*To all whom it may concern:*

Be it known that I, ROY FRANCIS ENSIGN, a citizen of the United States, residing at Pasadena, in the county of Los Angeles and State of California, have invented a new and useful Fuel Cleaner, of which the following is a specification.

A large amount of motor trouble is caused by impurities in the fuel, such as water, scale from the inside of the tank, small fibers and other dirt which is always likely to be present. These impurities, unless removed will clog the small passages of the carburetor or get under the float valve and cause a leaky carburetor.

An object of this invention is to remove impurities of this character that may interfere with the carburetor, and to make provision whereby the cleaner is very easily cleaned from such impurities.

Other objects are cheapness, simplicity, ease of manufacture and ease of assemblage.

A further object is that the cleaner shall be so constructed that the parts which need cleaning may be removed and replaced without disturbing the connections with the pipe line from the tank to the carburetor.

The effective operation of fuel cleaners heretofore employed have been impaired by becoming air bound so that the delivery of fuel to the carburetor has been interfered with; and an object of this invention is to provide means that will obviate such interference.

Other objects, advantages and features of the invention may appear from the accompanying drawing, the subjoined detailed description and the appended claims.

The accompanying drawing illustrates the invention.

Figure 1 is an axial section on line $x^1$ Fig. 2 of a fuel cleaner constructed in accordance with the invention in the form which I deem most satisfactory.

Fig. 2 is a plan of the cleaner shown in Fig. 1.

Fig. 3 is a plan of the body, the cap, the gasket and the strainer disassembled; the cap being inverted.

The fuel cleaner comprises a trap having an inlet and an outlet passage respectively formed in pipes 1, 2, leading from the tank, not shown, to the carburetor, not shown and consists of a body $b$ detachably secured to a cap $c$ which is permanently fixed to the pipes 1, 2. Said cap is provided with the inlet boss 3 and the outlet boss 4 threaded to said pipes and may also be provided with lugs 5 for connection to further supporting means.

The body $b$ comprises a downwardly tapering settling chamber 6 which is provided at its lower end with a drain cock 7, through which the impurities settling at the bottom of the chamber 6 may be drawn off from time to time. Said body $b$ is provided at the top of the settling chamber with an outer annular seat 8 and with a flange 9, which forms an inward overhanging rim at the top of the settling chamber 6, and is perforated at intervals with distributing ports 10, which are shown as being four in number, and equally spaced around the flange. Inside of said distributing ports 10 the flange is provided with an upwardly extending throat 11, open at bottom and top and forming an upwardly directed intermediate passage 12 leading from the top of the settling chamber 6. The top of said throat is provided with an annular screen seat 13. The seats 8 and 13 are in parallel planes.

The cap $c$ is provided with an inlet port 14 and an annular distributing chamber 15 into which said port 14 opens and is provided outside said chamber with an annular gasket seat 16 at the bottom of the chamber, and inside and above the top of the chamber with an annular screen seat 17, and is provided inside said annular screen seat 17 with a dome 18 above the plane of the top of the chamber and forming an outlet chamber above the intermediate passage 12.

Said gasket seat 16 and screen seat 17 of the cap are arranged in parallel planes, spaced apart a distance equal to the space between the parallel planes of the gasket seat 8 and the screen seat 13 of the body.

Said body is provided with a hub 19 carried by web 20 connected to the throat 11, and a stud 21 is fixed to and projects upward from said hub and passes through a central opening 22 in the dome of the cap, and is threaded to receive a nut 23; so that when said nut is screwed home the body is fastened to the cap.

A gasket 24 is seated on the annular seat 8, and is adapted to be compressed by the annular seat 16 when the nut 23 is screwed home. The screen 25, which is of fine brass wire gauze or other suitable material, is somewhat less in thickness than the gasket; so that when the nut 23 is screwed home sufficiently to compress the gasket 24 to make the joint between the cap and the body, gasoline tight, the screen will be held but there will be an air passage edgewise through the screen 25 to allow air to flow from the distributing chamber 15, into the dome 18 all around the top of the throat.

The outlet part 26 leads from the top of the dome 18 to the outlet pipe 2.

In practice the gasket and screen seats will be machined so that the cap without the gasket and the screen will fit each other snugly when the cap is in place on the body.

To install the fuel cleaner, the cap will be connected to the inlet and outlet pipes 1, 2, then the gasket and strainer will be placed upon the seats therefor on the body and the top of the throat; then the body will be pushed upward into place to bring the gasket and screen to their appropriate seats, the stud 21 being passed through the opening 22 therefor in the dome of the cap. Then the nut 23 will be screwed home to make the joint at gasket 24 gasoline tight, the cock 7 will be closed and the cleaner is in condition for use.

In practical operation the fuel enters through the inlet pipe 1 and through the port 14 into the annular distributing chamber 15 and from thence is directed downwardly through the widely separated distributing ports 10 along the outer periphery of the settling chamber 6. This gives a direction both to the fuel and any contained undesirable ingredients such as sand or microscopic dust or fibers and water.

On account of the relative areas of the inlet port 14 and of the settling chamber 6, which is of larger diameter at its top than at its bottom, the fuel in turning upwardly through the passage 12 will move so slowly that the foreign substances supported in the fuel will continue to fall toward the small diameter of the settling chamber 6 where they may be drawn off through the drain cock 7.

This construction results in a maximum of efficiency in settling and brings about better results than have been heretofore obtained for this type of apparatus.

The fuel on rising through the passage 12 continues so slowly that practically nothing except material which will float to the surface will ever reach the screen 25. The lighter material will rise to the screen and there be intercepted, and may be removed by unscrewing the nut 23 and withdrawing the body down from the cap, thus exposing the screen which may then be removed and cleaned.

By this construction and arrangement the interior of the cleaner may be readily gotten at for the purpose of cleansing the same without displacing the cap, which remains permanently connected in the fuel supply pipe line.

It is understood that a cock, not shown, will be provided at the supply tank, not shown, so that the fuel supply may be shut off when it is desired to detach the settling chamber 6.

The distributing chamber 15 has a natural tendency to become air-bound, and this is corrected by the location and means of holding the screen 25. The screen 25 is held lightly. The main portion of the pressure exerted by the nut 23 is sustained by the gasket 24, so that air bubbles, which may have accumulated in the fuel will pass through the edge of the screen 25 and thence flow on with the fuel without any tendency to air-bind the chamber 15 which would result in a stoppage of the flow of the fuel. This has been one of the difficulties in heretofore constructing fuel cleaners or traps of this kind.

I claim.

1. A fuel cleaner comprising a trap provided with a distributing chamber at its upper portion; a settling chamber at the lower portion of the trap, said settling chamber communicating with the distributing chamber; inlet and outlet passages at the upper portion of the trap; an intermediate passage between the inlet and outlet passages and communicating with the settling chamber; an inlet port communicating with the inlet passage and with the distributing chamber; an outlet port communicating with the outlet passage and with the intermediate passage; and a screen between the intermediate passage and the outlet port; said screen forming also an air passage between the distributing chamber and the outlet port.

2. A trap comprising a settling chamber at its lower portion, a distributing chamber and an intermediate passage above the settling chamber at its upper portion; an inlet port communicating with the distributing chamber; an outlet port communicating with the intermediate passage near the top thereof, and a screen between the intermediate passage and the outlet port; said screen being adapted and arranged to allow air to flow edgewise of the screen from the distributing chamber to the outlet port.

3. A trap comprising a settling chamber at its lower portion, a distributing chamber and an intermediate passage surrounded thereby at its upper portion; an inlet port communicating with the distributing chamber, an outlet port communicating with the intermediate passage, above the level of the distributing chamber; a strainer extending across the intermediate passage between the settling chamber and the outlet port, and an air passage between the distributing chamber and the space above the intermediate passage.

4. The combination with a settling chamber tapering downwardly, of a distributing chamber tapering upwardly and communicating with the top of the settling chamber, at widely separated ports; an inlet port opening into the distributing chamber; a throat forming an intermediate passage communicating with the top of the settling chamber; a screen on the throat, and an outlet port leading from the intermediate passage; there being an air passage edgewise of the screen from the top of the distributing chamber to the outlet space above the screen.

5. The combination with a settling chamber, of a cap forming a distributing chamber communicating with the top of the settling chamber; such communication being only through widely separated ports; an inlet port opening into the distributing chamber; an outlet chamber having an outlet port; an intermediate passage leading upward from the top of the settling chamber to the top of the distributing chamber and communicating with the outlet chamber; a strainer across the top of the intermediate passage and between the intermediate passage and outlet port; said inlet port and outlet port being in said cap, and adapted for connection with inlet and outlet pipes, respectively; and means for detachably securing the settling chamber to the cap.

6. The combination with a cap having an inlet port upon one level and an outlet port at a higher level, of a settling chamber arranged to be supplied at its top through the inlet port; a throat projecting upward from the top of the settling chamber and forming an intermediate passage leading from the settling chamber toward the outlet port, and a screen extending across the upper end of the throat, and clamped thereon by the cap, and forming a passage between said throat and cap; one end of said passage being at the edge of said screen.

7. The combination with a taper body comprising a settling chamber at its lower portion, distributing ports and a throat at its upper portion, and provided with an annular seat encircling the inlet ports; of a cap fitting said annular seat and provided with an inlet port and forming a chamber communicating with the distributing ports, and with an outlet port communicating with the throat; a screen over the throat, and means to secure the cap upon said body, the screen being clamped on the top of the throat and forming an air passage between said throat and cap.

8. A fuel cleaner set forth, comprising a cap provided with an inlet boss at one level and an outlet boss at a higher level threaded to receive inlet and outlet pipes; a body comprising a downwardly tapering settling chamber, provided at its lower end with a drain cock, and provided at the top of the settling chamber with an outer annular seat, and with a flange, which forms an inwardly overhanging rim at the top of the settling chamber, and which is perforated at intervals with distributing ports widely spaced around the flange; said flange being provided inside of said distributing ports with an upwardly extending throat, open at bottom and top, and forming an upwardly directed intermediate passage leading from the top of the settling chamber; the top of said throat being provided with an annular screen seat in parallelism with the outer annular seat, said cap being provided with an inlet port through the boss, and an annular distributing chamber into which said inlet port opens, and being provided outside said distributing chamber with an annular gasket seat at the bottom of the distributing chamber, and also being provided inside and above the top of the distributing chamber with an annular screen seat, and provided inside said annular screen seat with a dome above the plane of the top of the distributing chamber, and forming a chamber above the intermediate passage, there being an outlet port leading from said dome through the upper boss; said gasket seat and screen seat of the cap being arranged at parallel planes, spaced apart, a distance equal to the space between the parallel planes of the gasket seat, and the screen seat of the body; said body being provided with a hub, and a web which carries said hub, connected to said throat; a stud fixed to and projecting upward from said hub and passing through a central opening in the dome of the cap, and threaded to receive a nut; a nut screwed home to fasten the body to the cap; a gasket seated in the gasket seat, and a screen somewhat less in thickness than the gasket mounted on the screen seat at the top of said throat, so that when the nut is screwed home sufficiently to compress the gasket to make the joint between the cap and the body gasoline tight, the screen will be held, but there will be an air passage edgewise through the screen to allow air to flow from the distributing channel into the dome all around the top of the throat.

9. The combination of a body forming a settling chamber, and having an inwardly extending flange at the top of said chamber; a throat extending upward from said flange and forming an intermediate passage; a cap forming a distributing chamber and having an inlet port communicating with the distributing chamber and an outlet port communicating with the intermediate passage; said distributing chamber communicating with said settling chamber through ports in said flange; a screen across the top of said throat; and means for securing said cap to said body.

10. The combination of a body forming a settling chamber, and having an inwardly extending flange at the top of said chamber; a throat extending upward from said flange and forming an intermediate passage; a cap forming a distributing chamber and having an inlet port communicating with the distributing chamber and an outlet port communicating with the intermediate passage; said distributing chamber communicating with said settling chamber through ports in said flange; a screen across the top of said throat; a hub fixed to said throat; a stud fixed to said hub and extending upward through said cap; and means engaging said stud for securing said cap to said body.

11. A fuel cleaner comprising a body forming a settling chamber and having an inwardly extending flange at the top of said chamber; a throat extending upward from said flange and forming an intermediate passage; a distributing chamber communicating with said settling chamber through distributing ports in said flange; an inlet port communicating with said distributing chamber; an outlet chamber above the intermediate passage; a screen across the top of said throat and between the intermediate passage and the outlet chamber; and an outlet port communicating with the outlet chamber.

12. A fuel cleaner comprising a body forming a settling chamber and having an inwardly extending flange at the top of said chamber; a throat extending upward from said flange and forming an intermediate passage; a distributing chamber communicating with said settling chamber through distributing ports in said flange; an inlet port communicating with said distributing chamber; an outlet chamber above the intermediate passage; a screen across the top of said throat and between the intermediate passage and the outlet chamber; an outlet port communicating with the outlet chamber; and an air passage from the distributing chamber to the outlet chamber.

13. A fuel cleaner comprising a body forming a settling chamber and having an inwardly extending flange at the top of said chamber provided with distributing ports and a throat extending upward from flange and forming an intermediate passage; a cap adapted to be detachably secured to said body and forming a distributing chamber around said throat, said distributing chamber being in communication with said settling chamber through said ports; a screen across the top of said throat; an inlet port in said cap below the level of said screen and communicating with said distributing chamber; and an outlet port in said cap above the level of said screen and communicating with the intermediate passage.

In testimony whereof, I have hereunto set my hand at Los Angeles, California, this 8th day of April, 1919.

ROY FRANCIS ENSIGN.

Witness:
M. BEULAH TOWNSEND.